United States Patent
Masutani

(10) Patent No.: US 8,528,986 B2
(45) Date of Patent: Sep. 10, 2013

(54) SEATBELT PRETENSIONER MECHANISM FOR VEHICLE SEAT

(75) Inventor: Eiji Masutani, Tochigi-ken (JP)

(73) Assignee: TS Tech Co., Ltd., Saitama-Ken (JP)

( * ) Notice: Subject to any disclaimer, the term of this patent is extended or adjusted under 35 U.S.C. 154(b) by 410 days.

(21) Appl. No.: 12/527,506

(22) PCT Filed: Feb. 15, 2008

(86) PCT No.: PCT/JP2008/052579
§ 371 (c)(1),
(2), (4) Date: Feb. 28, 2011

(87) PCT Pub. No.: WO2008/099937
PCT Pub. Date: Aug. 21, 2008

(65) Prior Publication Data
US 2011/0198910 A1   Aug. 18, 2011

(30) Foreign Application Priority Data
Feb. 15, 2007  (JP) .................................. 2007-035543

(51) Int. Cl.
*A62B 35/04* (2006.01)
*B60R 21/0136* (2006.01)
*B60R 22/00* (2006.01)

(52) U.S. Cl.
USPC ................. 297/480; 297/216.1; 297/216.15; 297/216.16; 297/216.18

(58) Field of Classification Search
USPC ................. 297/216.1–216.18, 470, 471, 472, 297/473, 480
See application file for complete search history.

(56) References Cited

U.S. PATENT DOCUMENTS

| 5,188,425 | A | * | 2/1993 | Foster et al. ................... 297/473 |
| 5,538,284 | A | * | 7/1996 | Nishide et al. ............ 297/480 X |
| 5,634,690 | A | * | 6/1997 | Watanabe et al. ............. 297/480 |
| 5,671,949 | A | * | 9/1997 | Bauer et al. ............... 297/480 X |
| 5,788,025 | A | * | 8/1998 | Nishide et al. ............ 297/480 X |
| 5,794,978 | A | * | 8/1998 | Nishide ...................... 297/480 X |
| 5,871,236 | A | * | 2/1999 | Bauer et al. ............... 297/480 X |
| 6,039,353 | A | * | 3/2000 | Bauer et al. ............... 297/472 X |
| 6,050,635 | A | * | 4/2000 | Pajon et al. ................. 297/216.1 |
| 6,053,532 | A | * | 4/2000 | Wilkins et al. ............... 280/806 |
| 6,095,615 | A | * | 8/2000 | Wier ............................ 297/480 |
| 6,113,145 | A | * | 9/2000 | Evans ....................... 297/480 X |
| 6,139,111 | A | * | 10/2000 | Pywell et al. ........ 297/216.13 X |
| 6,142,524 | A | * | 11/2000 | Brown et al. ............. 297/480 X |

(Continued)

FOREIGN PATENT DOCUMENTS

| JP | 2003237533 A | 8/2003 |
| JP | 2005112099 A | 4/2005 |
| JP | 2006273167 A | 10/2006 |

*Primary Examiner* — Rodney B White
(74) *Attorney, Agent, or Firm* — Browdy and Neimark, PLLC

(57) ABSTRACT

A seatbelt mechanism (S) comprises a chip anchor (12) disposed to one of right and left sides of a seat bottom (3) of the vehicle seat (1) and coupled to a tip end of the seatbelt (10), and a tongue anchor (14) disposed to the other of the right and left sides of the seat bottom (3) and engaged with a tongue plate (13) disposed to an intermediate portion of the seatbelt (10). A pretensioner mechanism (21) moves both the chip anchor (12) and the tongue anchor (14) substantially at the same time to actively tenses the seatbelt (10) when the vehicle collision occurs. A moving distance of the chip anchor (12) is substantially equal to a moving distance of the tongue anchor (14).

9 Claims, 3 Drawing Sheets

(56) References Cited

U.S. PATENT DOCUMENTS

| | | | |
|---|---|---|---|
| 6,149,242 A * | 11/2000 | Pesta et al. | 297/480 |
| 6,164,700 A * | 12/2000 | Masuda et al. | 297/480 X |
| 6,227,563 B1 * | 5/2001 | Talisman | 297/216.15 X |
| 6,386,631 B1 * | 5/2002 | Masuda et al. | 297/216.1 |
| 6,398,285 B2 * | 6/2002 | Motozawa et al. | 297/216.15 X |
| 6,422,632 B1 * | 7/2002 | Kamei et al. | 297/216.1 X |
| 6,435,591 B1 * | 8/2002 | Nilsson | 297/216.14 X |
| 6,435,592 B2 * | 8/2002 | Nilsson | 297/216.14 X |
| 6,497,456 B1 * | 12/2002 | Masuda et al. | 297/480 |
| 6,513,880 B2 * | 2/2003 | Yamaguchi et al. | 297/480 X |
| 6,565,121 B2 * | 5/2003 | Knych et al. | 297/480 X |
| 6,746,077 B2 * | 6/2004 | Klukowski | 297/216.1 |
| 6,824,187 B2 * | 11/2004 | Motozawa et al. | 297/216.16 X |
| 6,840,544 B2 * | 1/2005 | Prentkowski | 297/480 X |
| 6,851,505 B2 * | 2/2005 | Motozawa et al. | 297/216.1 X |
| 6,851,715 B2 * | 2/2005 | Devereaux et al. | 297/480 X |
| 6,942,251 B2 * | 9/2005 | Birk et al. | 297/480 X |
| 7,168,742 B2 * | 1/2007 | Tomita | 297/480 X |
| 7,172,218 B2 * | 2/2007 | Nakano et al. | 297/480 X |
| 7,229,133 B2 * | 6/2007 | Maddelein et al. | 297/216.1 X |
| 7,380,832 B2 * | 6/2008 | Gray et al. | 280/806 |
| 8,109,568 B2 * | 2/2012 | Masutani | 297/216.15 |
| 2003/0155801 A1 | 8/2003 | Tatematsu et al. | |
| 2004/0051353 A1 * | 3/2004 | Klukowski | 297/216.1 |
| 2011/0133529 A1 * | 6/2011 | Guerrero | 297/216.18 |
| 2011/0210586 A1 * | 9/2011 | Masutani | 297/216.1 |
| 2012/0175937 A1 * | 7/2012 | Kujawa et al. | 297/480 |

* cited by examiner

SEATBELT PRETENSIONER MECHANISM FOR VEHICLE SEAT

TECHNICAL FIELD

The present invention relates to a vehicle seat, and more particularly to a seatbelt pretensioner mechanism for promptly restricting a seat occupant by actively tensing a seatbelt when large external force acts on a vehicle body due to vehicle collision and the like.

BACKGROUND ART

A seatbelt mechanism of a conventional vehicle seat has a seatbelt and a belt retractor, and the belt retractor regulates the seatbelt from being pulled out when large external force acts on a vehicle body due to vehicle collision and the like and restricts a seat occupant so that he or she does not move in an unpreferable direction.

Although the belt retractor can regulate the seatbelt from being pulled out in vehicle collision, it cannot take up the seatbelt. That is, the belt retractor cannot actively tense the seatbelt. Therefore, the seat occupant is liable to move in the unpreferable direction.

In contrast, there has been developed a seatbelt pretensioner mechanism for promptly restricting a seat occupant by actively tensing a seatbelt in vehicle collision (refer to Japanese Patent Application Laid-Open No. 2003-146184). The pretensioner mechanism moderates an unpreferable movement of a seat occupant because it can promptly restrict him or her.

Patent Document 1: JP 2003-146184 A1

DISCLOSURE OF THE INVENTION

A conventional pretensioner mechanism tenses a seatbelt by absorbing loosening of the seatbelt by moving one of a chip anchor and a tongue anchor. Therefore, only one of a left side and a right side of the seatbelt is strongly pulled. This is a factor for inhibiting restriction of a seat occupant in a stable attitude. Further, since the seatbelt is pulled on only one side of the left side and the right side, it is difficult to secure a sufficient amount of margin for pulling the seatbelt. Further, since the seatbelt is pulled on only one side of the left side and the right side, a time during which the seatbelt is tensed is increased.

An object of the present invention is to provide a seatbelt pretensioner mechanism capable of restricting a seat occupant in a stable attitude.

Another object of the present invention is to provide a seatbelt pretensioner mechanism capable of more promptly restricting a seat occupant.

Further, still another object of the present invention is to provide a seatbelt pretensioner mechanism having a simple structure at a less expensive cost.

BEST MODE FOR CARRYING OUT THE INVENTION

Figure 1:
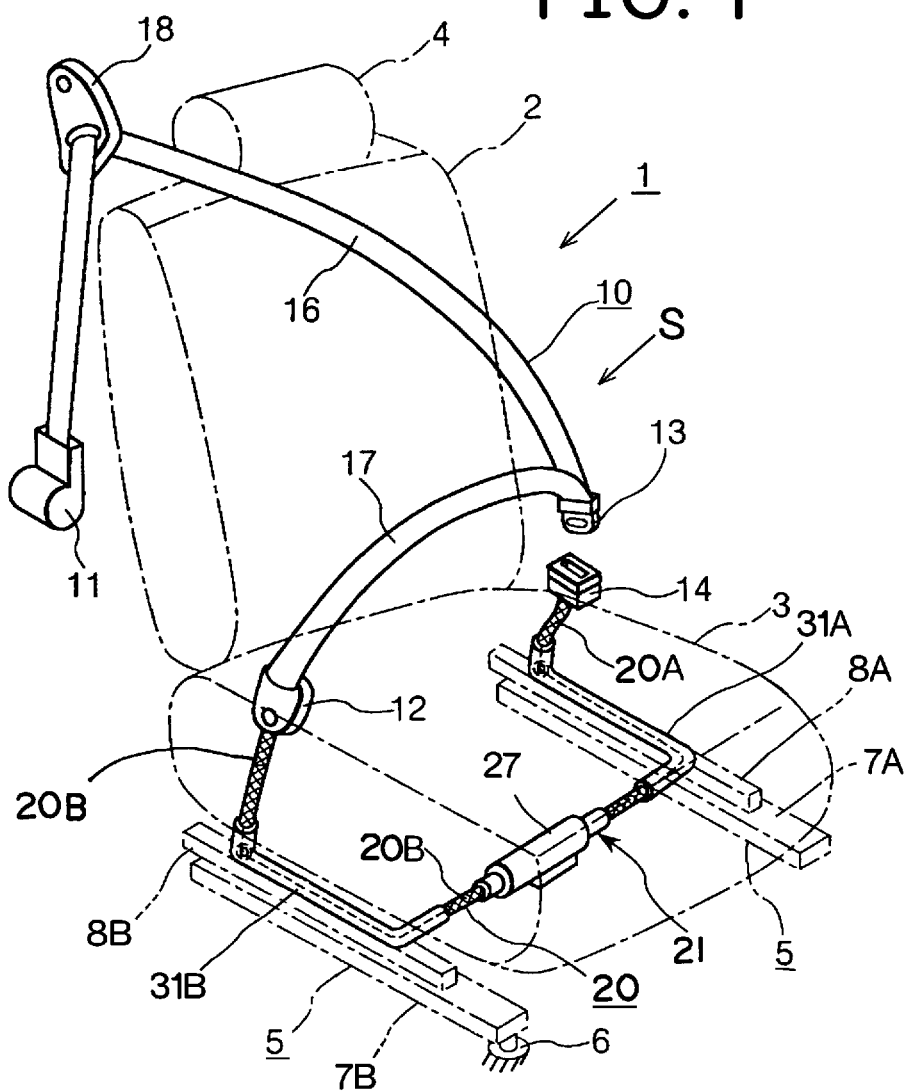
FIG. 1 is a perspective view showing a vehicle seat of the present invention.

A vehicle seat 1 according to an embodiment of the present invention has a seat bottom 3 slidably attached to a vehicle body (floor panel) 6 through a slide mechanism 5, a seat back 2 rotatably attached to the seat bottom 3, and a head rest 4 attached to the seat back 2. The seat back 2 is held at an arbitrary angle with respect to the seat bottom 3 by a reclining mechanism (not shown).

The slide mechanism 5 has lower rails 7A, 7B fixed to the vehicle body 6 and upper rails 8A, 8B slidably engaged with the respective lower rails 7A, 7B.

The vehicle seat 1 has a seat bet mechanism S. The seatbelt mechanism S has a seatbelt 10, a belt retractor 11 (FIG. 1) coupled with a base portion of the seatbelt 10, a tongue plate 13 attached to an intermediate portion of the seatbelt 10, a tongue anchor 14 with which the tongue plate 13 is detachably engaged, and a chip anchor 12 coupled with a tip end of the seatbelt 10. When strong inertia force acts on a seat occupant due to collision (hereinafter, called vehicle collision) caused by a traffic accident and the like, the belt retractor 11 regulates the seatbelt 10 from being pulled out and restricts the seat occupant for protection. The tongue plate 13 is position-adjustably attached to the seatbelt 10.

The seatbelt 10 is partitioned to a shoulder belt 16 between the belt retractor 11 and the tongue plate 13 and a wrap belt 17 between the tongue plate 13 and the chip anchor 12. The seatbelt mechanism S further has a through anchor 18 for supporting the shoulder belt 16. Although the through anchor 18 and the belt retractor 11 are generally disposed to the vehicle body 6, it may be disposed to the vehicle seat 1.

The vehicle seat 1 has a pretensioner mechanism 21 for actively tensing the seatbelt 10 when vehicle collision occurs and reducing a forward movement, a rightward movement, or a leftward movement (which are called unpreferable movements) of the seat occupant.

Figure 2:
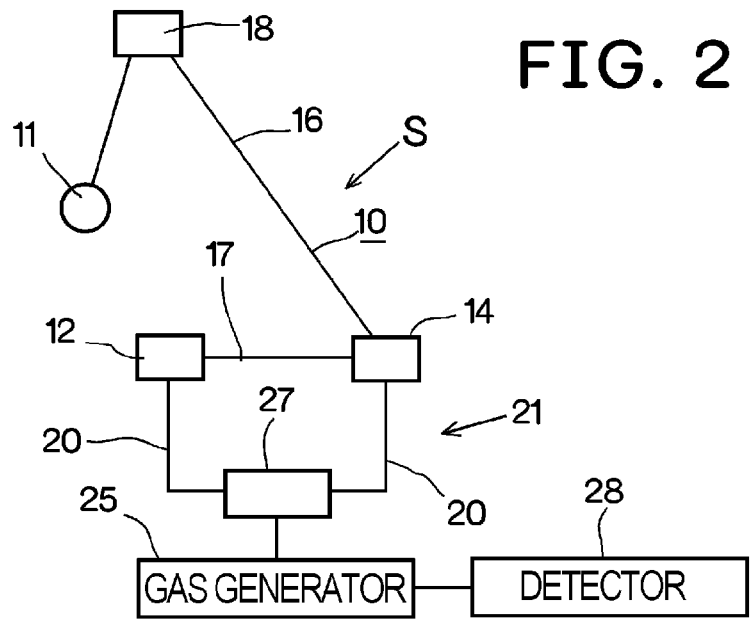
FIG. 2 is a schematic view showing an outline of a seatbelt mechanism and a pretensioner mechanism of the vehicle seat.

FIG. 2 shows a basic concept of the pretensioner mechanism 21. The pretensioner mechanism 21 has a collision detector 28 for detecting vehicle collision, a gas generator 25 for generating gas in response to a signal from the collision detector 28, a wire cable 20 coupled with the tongue anchor 14 and the chip anchor 12, and a cable pull means 27 for pulling the wire cable 20.

When the collision detector 28 detects vehicle collision, the gas generator 25 instantly supplies a great amount of gas to the cable pull means 27, and the cable pull means 27 moves the tongue anchor 14 and the chip anchor 12 through the wire cable 20 by expansion energy of the gas to thereby actively tense the seatbelt 10. The seat occupant is more promptly restricted by the seatbelt 10 so that the unpreferable movements of the seat occupant can be reduced.

What is important here resides in that the pretensioner mechanism 21 moves both the tongue anchor 14 and the chip anchor 12. Moving both the tongue anchor 14 and the chip anchor 12 can more promptly and more strongly tense the seatbelt 10 than moving one of them.

Further, it is also important that the pretensioner mechanism 21 moves both the tongue anchor 14 and the chip anchor 12 substantially at the same time. A simultaneous movement can restrict the seat occupant in a more stable attitude than a non-simultaneous movement or a one-side movement. Here, the term "substantially at the same time" means to set no conscious time difference.

Preferable embodiments of respective portions of the pretensioner mechanism 21 will be described. The cable pull means 27 has a cylinder 23 which extends in a right-left direction of the vehicle body, and a piston 24 which moves in the cylinder 23. The cable pull means 27 is disposed to a lower front portion of the seat bottom 3. An accommodation space can be relatively easily secured in the lower front portion of the seat bottom 3 without sacrificing comfort of the seat bottom 3.

Figure 3:
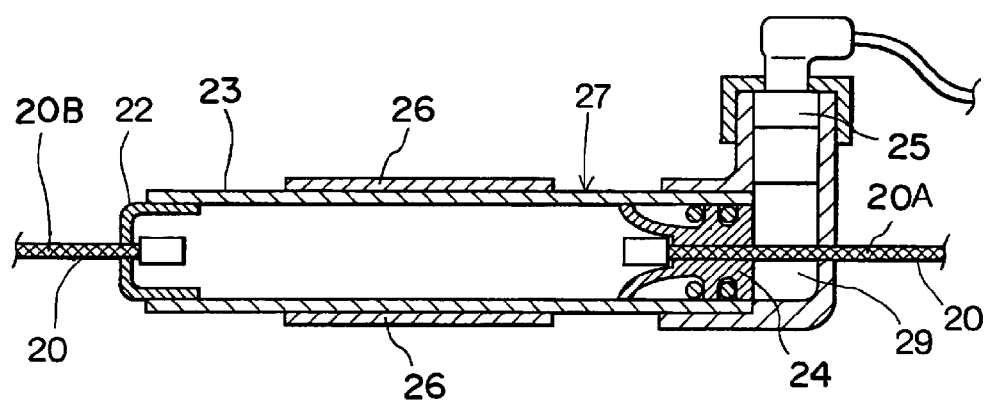
FIG. 3 is a sectional view showing a cable pull means of the pretensioner mechanism.

When the gas generator 25 is directly or indirectly coupled with an expansion chamber 29 of the cylinder 23 partitioned by the piston 24 and gas is supplied into the expansion chamber 29 from the gas generator 25, the piston 24 moves left in FIG. 3.

The wire cable 20 has a first cable 20A coupled with the tongue anchor 14 and a second cable 20B coupled with the chip anchor 12. The other end of the first cable 20A is coupled with the piston 24, and the other end of the second cable 20B is coupled with a coupling cap 22 fixed to an open end of the cylinder 23. The coupling cap 22 does not have a hermetically seal performance and has a function for fixedly coupling the other end of the second cable 20B with the cylinder 23. A space 30 in the cylinder 23 between the coupling cap 22 and the piston 24 is a non-hermetically-sealed space opened externally and used as a moving space of the piston 24.

Figure 4:
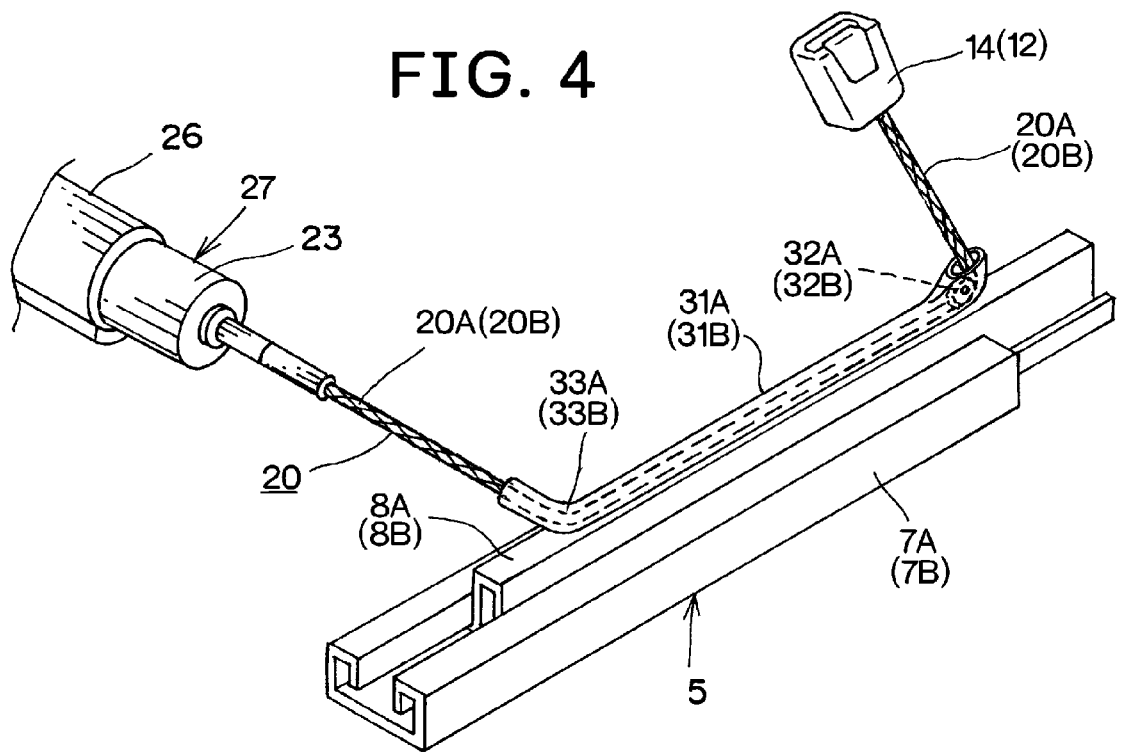
FIG. 4 is a perspective view showing a cable guide of the vehicle seat and a wire cable of the pretensioner mechanism.

As shown in FIG. 4, hollow cable guides 31A, 31B, through which intermediate portions of the cables 20A, 20B pass, are disposed to the upper rails 8A, 8B of the slide mechanism 5, respectively. The cable guides 31A, 31B extend in a front-back direction, and rollers or pulleys 32A, 32B for guiding the cables 20A, 20B upward are disposed to rear ends of the cable guides 31A, 31B. Further, inward curving portions 33A, 33B for guiding the cables 20A, 20B to the cable pull means 27 are disposed to front ends of the cable guides 31A, 31B.

A manipulation coupling distance between the tongue anchor 14 and the chip anchor 12 is ordinarily kept to a predetermined distance by the first cable 20A, the second cable 20B, and the cable pull means 27. The cylinder 23 is attached to the vehicle seat 1 by a guide member 26 so that it is free to move in a length direction of the cylinder 23. Note that since the cylinder 23 is substantially supported by the cables 20A, 20B on both the sides thereof, the guide member 26 may be omitted.

When the gas generator 25 supplies a great amount of gas to the expansion chamber 29 due to vehicle collision, the piston 24 is pushed out to the left with respect to the cylinder 23 in FIG. 3. What is important here resides in that the cylinder 23 of the present invention can move with respect to the vehicle seat 1 (or the vehicle body 6). Therefore, a great amount of gas supplied to the expansion chamber 29 pushes out the piston 24 to the left with respect to the cylinder 23 and, at the same time, moves the cylinder 23 to the right with respect to the piston 24. In other words, the piston 24 and the cylinder 23 are moved in an opposite direction by the reaction force thereof.

Figure 5:
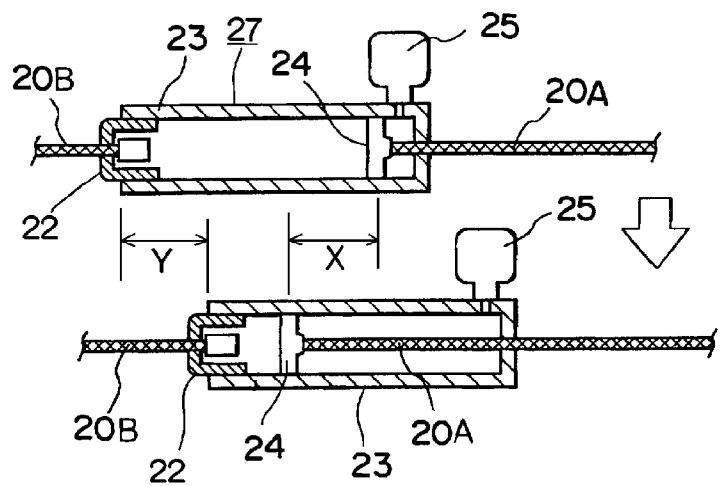
FIG. 5 is a comparison view for comparing a state before the pretensioner mechanism is operated and a state after it is operated.

FIG. 5 shows a state that gas moves the piston 24 and the cylinder 23. When a great amount of gas is supplied to the expansion chamber 29, the piston 24 and the cylinder 23 change from a state shown above before vehicle collision occurs to a state shown below after vehicle collision occurs. As shown in FIG. 5, gas energy moves the piston 24 to the left by a distance X to thereby move the tongue anchor 14 through the first cable 20A. Further, the gas energy moves the cylinder 23 to the right by a distance Y to thereby move the chip anchor 12 through the second cable 20B.

In the present invention, since the tongue anchor 14 and the chip anchor 12 can be moved by the gas energy, the seatbelt 10 can be greatly moved.

In the present invention, since the tongue anchor 14 and the chip anchor 12 can be moved by the gas energy, the seatbelt 10 can be promptly moved.

In the present invention, since the tongue anchor 14 and the chip anchor 12 can be moved by the gas energy substantially at the same time, the seat occupant can be restricted in the stable attitude for protection.

In the present invention, since the piston 24 and the cylinder 23 are moved by the reaction force thereof, the moving distance X of the piston 24 is substantially equal to the moving distance Y of the cylinder 23. Accordingly, the seat occupant can be restricted in the stable attitude for protection. Here, the term "substantially equal" means that the moving distance is not consciously changed.

In the present invention, since the piston 24 and the cylinder 23 are moved in the opposite direction, the moving space of the piston 24 and the cylinder 23 can be easily secured.

In the present invention, since the tongue anchor 14 and the chip anchor 12 can be moved by the single cable pull means 27, a manufacturing cost can be less expensive.

In the present invention, since the tongue anchor 14 and the chip anchor 12 can be moved by the cable pull means 27, the pretensioner mechanism can be manufactured at a less expensive cost.

In the present invention, since the respective end portions of the first cable 20A and the second cable 20B extend in the length direction of the cylinder 23, the first cable 20A and the second cable 20B can be efficiently coupled with the piston 24 and the cylinder 23.

In the present invention, since the cable pull means 27 is disposed to the lower front side portion of the seat bottom 3 in which the accommodation space can be relatively easily secured and the intermediate portions of the cables 20A, 20B are covered with the cable guides 31A, 31B disposed to the upper rails 8A, 8B, an increase of the vehicle seat 1 can be suppressed.

The invention claimed is:

1. A vehicle seat having a seatbelt mechanism including a seatbelt and a pretensioner mechanism for actively tensing the seatbelt when strong external force acts on a vehicle body due to vehicle collision, wherein the seatbelt mechanism comprises a chip anchor disposed to one of right and left sides of a seat bottom of the vehicle seat and coupled to a tip end of the seatbelt and a tongue anchor disposed to the other of the right and left sides of the seat bottom and engaged with a tongue plate disposed to an intermediate portion of the seatbelt, and the pretensioner mechanism moves both the chip anchor and the tongue anchor to actively tension the seatbelt when the vehicle collision occurs, wherein the pretensioner mechanism has one cylinder, a piston movable in the cylinder, an expansion chamber of the cylinder partitioned by the piston, and a gas generator for supplying gas to the expansion chamber, the cylinder is coupled with one of the chip anchor or the tongue anchor through a first cable, the piston is coupled with the other one of the chip anchor or the tongue anchor through a second cable, and the cylinder and the piston are moved in an opposite direction with respect to one another by gas energy from the gas generator.

2. The vehicle seat according to claim 1, wherein the pretensioner mechanism moves both the chip anchor and the tongue anchor substantially at the same time.

3. The vehicle seat according to claim 1, wherein a moving distance of the chip anchor is substantially equal to a moving distance of the tongue anchor.

4. The vehicle seat according to claim 1, wherein
the cylinder is coupled with the chip anchor through the first cable, and
the piston is coupled with the tongue anchor through the second cable.

5. The vehicle seat according to claim 4, wherein the cylinder is disposed to the vehicle seat so as to be free to move in a length direction of the cylinder.

6. The vehicle seat according to claim 5, wherein respective end portions of the first cable and the second cable coupled with the cylinder and the piston extend in the length direction of the cylinder.

7. The vehicle seat according to claim 4, wherein the seat bottom is slidably attached to the vehicle body in a front-back direction of the vehicle body by a slide mechanism,
the cylinder is disposed to a lower front portion of the seat bottom, and
intermediate portions of the first cable and the second cable are disposed along a first upper rail and a second upper rail of the slide mechanism.

8. The vehicle seat according to claim 4, wherein the length direction of the cylinder is equal to a right-left direction of the seat bottom.

9. The vehicle seat according to claim 1, wherein
the cylinder is coupled with the tongue anchor through the first cable, and
the piston is coupled with the chip anchor through the second cable.

* * * * *